United States Patent Office 3,189,162
Patented June 15, 1965

3,189,162
ROLLER CONVEYOR
Per Gunnar Brundell and Karl-Erik Arnold Jonsson, Gavle, Sweden, assignors to Soderhamns Verkstader Ab., Soderhamn, Sweden, a corporation of Sweden
Filed Dec. 26, 1962, Ser. No. 247,197
2 Claims. (Cl. 198—127)

The invention relates to a roller conveyor particularly useful for feeding lumber.

In a roller conveyor previously known two frusto-conical rollers provided with prongs and having their narrower ends facing each other are mounted on a common horizontal shaft to form a conveyor path substantially V-shaped in cross section.

Another roller conveyor also previously known is composed of two flat, frusto-conical rollers turning their thicker ends onto each other and having their supporting surfaces located in a common horizontal plane. The purpose of this device is said to be to facilitate a broadside discharge from the conveyor in either direction.

The object of the invention is to provide an improved and in some respects more effective roller conveyor which is especially suited for feeding logs into debarking machines of the hollow rotor type, although it may also be used to advantage for other purposes. According to the invention at least one pair of frusto-conical rollers provided with prongs to engage a log to be advanced are journalled with their thicker ends adjacent each other, and said rollers are mounted such that the supporting portions of their surfaces enclose together an angle of about 60 to 150° in a plane perpendicular to the direction of travel.

When feeding logs into a debarking machine this new conveyor shows i.e. the valuable function that coarse logs are fed a little slower than thinner ones, as they will be supported by outer roller sections having smaller diameters and correspondingly lower peripheral speeds. This effect is especially obvious when the new conveyor is compared with the known V-shaped conveyor mentioned above, which instead feeds coarse logs more rapidly than the thinner logs. The axes of the rollers may be mounted inclined forwardly in the direction of travel whereby the prongs will move the logs onto the center line of the conveyor, and if the prongs are designed in a certain way as will be described hereinafter, it is possible to obtain the further action that a log is effectively secured in its centered position during the travel. In this way it may be possible to eliminate entirely the additional rollers which otherwise are often mounted to engage a log on the conveyor from above to guide it into the inlet of a debarking rotor.

Figure 1:
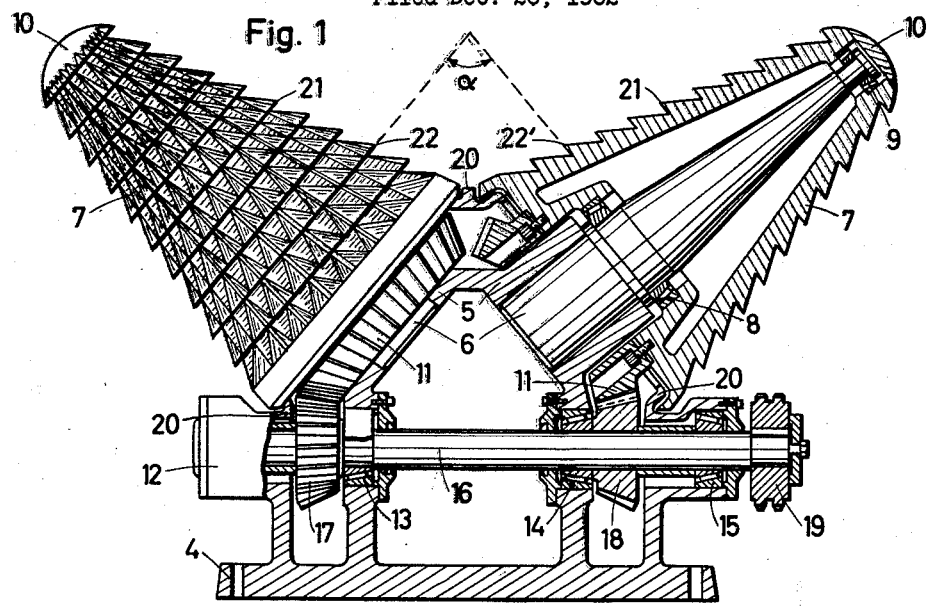
Figure 2:
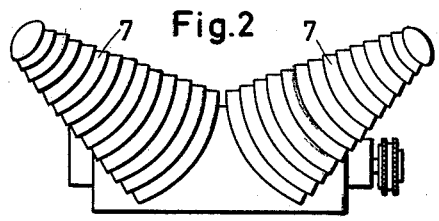
Figure 3:
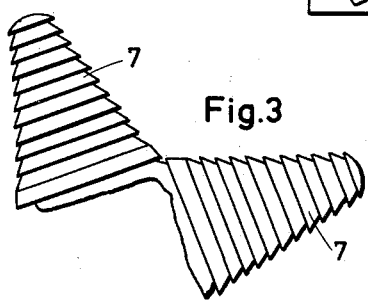

The invention will be described more in detail with reference to the accompanying drawings, in which FIGURE 1 shows an end view of a preferred embodiment, with its greater part in section;

FIGURE 2 is a view from above of an embodiment which otherwise may be designed as shown in FIG. 1, and FIGURE 3 is a diagrammatic, fractional end view of an unsymmetrical conveyor inclined to one side.

In FIG. 1, 4 designates a frame provided with two sockets 5 inclined upwardly in opposite directions from the center line. The sockets 5 serve as attachments for the lower ends of spindles 6 which are tapered toward their upper ends. A frusto-conical roller 7 tapered toward its upper end is journalled on each spindle 6 by means of two ball bearings 8 and 9 spaced axially. Outside the spindle 6 the roller 7 has a cap 10 fixed to it by screws. The opposite or lower end of the roller has fixed to it a bevel gear 11 surrounding the socket 5 with clearance.

Below the sockets 5 the frame 4 carries a horizontal shaft 16 perpendicular to the direction of conveyance. The shaft 16 is journalled in four bearings 12–15 and has keyed to it two bevel gears 17 and 18 each meshing with one of the gears 11 fixed to the rollers 7. One end of the shaft 16 projecting outside the frame has fixed to it a sprocket wheel 19 adapted to be driven by a chain from a reduction gear (not shown) which is in turn driven by a motor.

To prevent wood chips and other impurities from dropping down between the rollers and clogging the driving means. An angular protective shield or hood 20 is fixed to the frame 4 immediately below the rollers in such a way that the space is entirely covered. Thus, the hood 20 is designed with two circular openings each dimensioned to receive with clearance the mounting end of one of the gears 11 fixed to the rollers 7. To facilitate the mounting the hood 20 may be divided in two halves in a vertical plane through the axes of the gears 11, said halves being then connected to each other by some suitable means.

In the embodiment shown in FIG. 1, the log supporting portions of the roller surfaces form an angle of about 130° in the plane of the drawing. Of course, this angle must not be too acute nor is a too great angle useful, if the desired effect should be obtained. As mentioned above, the lower and upper limits are about 60° and 150° respectively. Also the cone angle of the rollers may vary, and, of course, the difference in peripheral speed for different roller sections will be increased to the extent the cone angle is made greater. The surfaces of the rollers 7 are provided with spikes or prongs 21 arranged relatively close to each other in peripheral rows.

The roller conveyor shown in an end view in FIG. 1 may to an advantage have the horizontal projection shown in FIG. 2. The rollers 7 are here skewed forwardly in the direction of feed, and in this connection the prongs 21 will provide an especially valuable function. When, upon rotation of the rollers, the prongs 21 are passing the highest points of their circular paths they also move a little inwardly onto the vertical center plane of the conveyor, and when engaging a log advanced on the rollers the prongs will thus act to displace said log inwardly toward the center line of the conveyor.

A quite unique effect is obtained, if the prongs are designed and directed such that their side surfaces 22 and 22' facing inwardly are inclined with respect to the central vertical plane. In other words, a line drawn along said inner surface of a prong in the plane of FIG. 1 converges upwardly with respect to a corresponding line along the inner surface of a prong on the opposite roller, as indicated by the angle α in FIG. 1. The inner side surfaces 22 and 22' are disposed at an angle of not greater than ninety degrees to the axes of the rollers 7 as shown in FIG. 1 and as a result a log engaged by the prongs will thus be subjected to a clamping action effective to secure the log in position during its advance on the conveyor. In some cases the log is held so firmly that a considerable force may be required to lift it from the rollers. As already mentioned, such a device is of particular value, if logs are to be fed into the inlet end of a debarking rotor, in which case the downward holding rollers previously often used may be excluded.

The embodiment in FIG. 3 has for its only purpose to show that the conveyor may also be inclined laterally. Such a construction may be useful in the event the logs are to be supplied from the side to a conveyor composed of a row of pairs of rollers. For the rest, the conveyor shown in FIG. 3 does not differ from the construction described. The only difference will be that the beveled gears must be given different cone angles.

What we claim is:

1. A roller conveyor for feeding logs or the like, said conveyor comprising a frame, at least one pair of spindles mounted on said frame in upwardly diverging relationship, at least one pair of frusto-conical rollers rotatably mounted on said spindles in upwardly diverging relationship with the ends of larger diameter disposed adjacent each other at the lower ends of said rollers to provide a trough-like log receiving space having an included angle of the order of between sixty and one hundred fifty degrees and a plurality of log penetrating prongs distributed peripherally and longitudinally on each roller, the prongs on one roll being disposed symmetrically with respect to the prongs on the other roll, each prong having in its log penetrating position one lower side clamping surface disposed at an angle of not greater than ninety degrees to the axis of said spindle and inclined inwardly toward the log in a plane converging upwardly toward the central vertical plane of the conveyor, the included angle between an opposed pair of lower clamping surfaces being not less than ninety degrees, whereby a log will be clamped between opposed pairs of converging clamping surfaces in a manner to prevent upward movement of the log with respect to said rollers.

2. A roller conveyor as defined in claim 1, in which the axes of said rollers are inclined forwardly in the direction of movement of a log engaging said rollers.

References Cited by the Examiner

UNITED STATES PATENTS

| | | |
|---|---|---|
| 1,795,137 | 3/31 | Nye. |
| 2,005,799 | 6/35 | Nicholson et al. _____ 144—208 |
| 3,038,587 | 6/62 | Bilocq _____ 198—127 |
| 3,068,918 | 12/62 | Smith. |

FOREIGN PATENTS 1,196,232   5/59   France.

LESTER M. SWINGLE, *Primary Examiner.*

WILLIAM W. DYER, Jr., *Examiner.*